United States Patent

Strauel

[11] Patent Number: 5,945,003
[45] Date of Patent: Aug. 31, 1999

[54] METHOD FOR ELIMINATING HEAVY METALS FROM A PHOTOGRAPHIC EFFLUENT

[75] Inventor: Philippe Strauel, Givry, France

[73] Assignee: Eastman Kodak Company, Rochester, N.Y.

[21] Appl. No.: 08/936,274

[22] Filed: Sep. 24, 1997

[30] Foreign Application Priority Data

Sep. 25, 1996 [FR] France .................................. 96 11960

[51] Int. Cl.⁶ ...................................................... C02F 1/28
[52] U.S. Cl. ............................................................ 210/688
[58] Field of Search ..................... 210/688, 717, 210/912

[56] References Cited

U.S. PATENT DOCUMENTS

| | | | |
|---|---|---|---|
| 4,744,825 | 5/1988 | Chen et al. | 210/688 |
| 4,752,397 | 6/1988 | Sood | 210/688 |
| 5,360,547 | 11/1994 | Cockett et al. | 210/69 |

FOREIGN PATENT DOCUMENTS 0566260  10/1993  European Pat. Off. .

*Primary Examiner*—Ivars Cintins
*Attorney, Agent, or Firm*—John R. Everett

[57] ABSTRACT

The present invention concerns a method for the depollution of photographic effluents. The method of the invention comprises the step of forming in situ in the effluent an adsorbent of the hydrotalcite type. This method is useful for the elimination of silver and iron in photographic effluents.

5 Claims, No Drawings

METHOD FOR ELIMINATING HEAVY METALS FROM A PHOTOGRAPHIC EFFLUENT

FIELD OF THE INVENTION

The present invention concerns the treatment of aqueous effluents containing heavy metals such as silver and iron, for the elimination or recovery of these metals.

BACKGROUND

Iron and silver are present, sometimes in large quantities, in numerous effluents and, in particular, in photographic effluents.

The elimination of heavy metals in effluents before their disposal to the sewage plant is becoming a necessity in order to satisfy the standards for waste laid down for better protection of the environment. Silver is one of the metals envisaged by these standards. Various techniques have been described for the elimination of silver. Precipitation in the form of hydroxide or sulphur, electrolysis, calcination and flocculation remain the most common techniques. Flocculation uses thickeners such as silicates, and/or flocculents.

For the elimination of metals, the use of ion exchange resins or zeolites has also been described, but this technique appears to be applicable only to effluents which contain only small quantities of silver. Furthermore, saturation of the resin or zeolite occurs rapidly. Finally, zeolite can, apart from silver, adsorb organic substances which contribute to a reduction in its efficacy. Treatment by zeolite is described by J E Garcia Hermandez et al in "Environ. Pollut.", 76 (3), 219–223 (1992) and treatment by resins is described by M Diaz et al in "J. Metall" 39 (7) 42–44 (1987).

An aluminium and magnesium hydroxycarbonate designated by the name of hydrotalcite, existing in the natural state, but also prepared by synthesis, has been used as an adsorbent in order to extract metallic complexes from aqueous solutions in which they are found.

U.S. Pat. No. 4,752,397 describes a method for purifying an aqueous effluent by passing it through a calcinated hydrotalcite. The substances (metallic complexes) adsorbed on the hydrotalcite are then desorbed.

U.S. Pat. No. 4,867,882 describes a method for eliminating from an aqueous effluent anionic complexes, for example a complex of silver dithiosulphate or copper-EDTA, by passing this effluent over a hydrotalcite.

Conventionally, hydrotalcite is used in the form of a fine powder, the elimination of which by decanting and filtration is difficult. Hydrotalcites are mixed hydroxycarbonates, notably of magnesium and aluminium. They are usually prepared by co-precipitating magnesium and aluminium hydroxides at a pH around 10 in order to obtain a powder hydrotalcite. It is also possible to calcinate the hydrotalcite powder. This powder is an efficacious adsorbent for ions and complexes of heavy metals.

DEFINITION OF TERMS

In the present application, the expression "heavy metals" essentially designates metals in the form of cations or complexes, inorganic or organic and having an atomic number above 20. In the case of a photographic effluent, this expression relates above all to iron, coming from bleaching agents and silver, coming from photographic emulsions.

The expression "photographic effluent" designates any effluent or mixture of effluents coming from the processing exposed photographic materials such as fixing, bleaching, stabilizing baths, rinsing or washing waters from the various stages of a photographic processing. The content of heavy metals especially silver and iron present in such effluents can be comprised between 1 and 1000 ppm.

SUMMARY OF THE INVENTION

It has been found, according to the present invention, that it was possible to improve the adsorbent action of hydrotalcites by forming them in situ in the medium containing heavy metals.

The use of hydrotalcites formed in situ lowers the concentration of heavy metals, depending on the initial content, to values below 1 ppm and, advantageously, below 0.1 ppm.

The method according to the invention for eliminating heavy metals in an effluent resulting from a photographic process comprises the steps of forming in this effluent a hydrotalcite, leaving the effluent and hydrotalcite in contact with each other for a sufficient period to adsorb the heavy metals on the hydrotalcite, and then separating the hydrotalcite with the heavy metals adsorbed thereon from the effluent.

PREFERRED EMBODIMENTS

According to one embodiment, the hydrotalcite is obtained in situ in the effluent from precursors added directly to the effluent. These precursors are preferably water-soluble salts, for example a mixture of a divalent metal salt and a trivalent metal salt, and an alkali is added in order to precipitate the hydrotalcite. The divalent metal can be in the form of a cation such as $Mg^{++}$, $Ni^{++}$, $Zn^{++}$, $Mn^{++}$ and the trivalent metal can be in the form of a cation such as $Al^{+++}$, $Cr^{+++}$, $Fe^{+++}$. Normally skilled persons will identify other cations which can be used to obtain hydrotalcites having the general formulae given in the technical literature. Anions of precursor salts can be any appropriate inorganic anion, for example $F^-$, $Cl^-$, $Br^-$, $I^-$, $ClO_4^-$, $CO_3^{--}$, $NO_3^-$, $SO_4^{--}$, or organic anions such as sulfonate, etc.

The amount of hydrotalcite to be formed in situ in the effluent can vary depending on the composition of the effluent and particularly on how much heavy metal ions is present in the effluent. This amount of hydrotalcite formed in the effluent can be within the range of about from $10^{-4}$ M to $10^{-2}$ M aluminum or more, which corresponds to an amount of hydrotalcite in the range of from 0.06 to 0.6 g/l, or more.

According to an embodiment of the invention, a flocculent and/or a silicate can also be used.

The silicate can be a silicate of an alkali metal, for example sodium silicate.

The flocculent can be of the organic or inorganic type or a derivative of a naturally occuring substance.

The organic flocculents which can be used according to the present invention comprise, for example, poly (ethylenamine), poly[N-(dimethylaminoethyl)acrylamide], 2-vinylimidazolium polybisulfate, diallyldimethylammonium polychloride, poly(N,N-dimethylaminoethyl methacrylate), poly[N-(dimethylaminopropyl) methacrylamide], sodium polyacrylate), ammonium polyacrylate, sodium polystyrene sulfonate), polyacrylamide, ethylene polyoxide, polyvinylpyrrolidone).

According to the present invention, inorganic flocculents comprise, for example, alums [$Al_2(SO_5)_3$—$xH_2O$; with $x \approx 14$], aluminium polychloride, sodium aluminate, iron trichloride, calcium oxide, diferro trissulfate heptahydrate, iron sulfate heptahydrate, a mixture based on CaO and MgO, calcium hydroxide, a Ca(OH)$_2$/MgO mixture, a Ca(OH)$_2$/Mg(OH)$_2$ mixture, bentonite and magnesium bicarbonate.

According to the present invention, flocculents derived from natural substances are, for example, starch, guar gum, chitosan, gelatin, alginic acid, sodium alginate, sodium carboxymethylcellulose, xanthan, tannins and dextran.

According to the present invention, the alkali can be of the organic or inorganic type and must enable the pH of the effluent to be adjusted to values between 9 and 12 and preferably between 9 and 10.

The hydrotalcite formed in situ by the said method is, according to X-diffraction data, identical to hydrotalcites either of natural origin, or prepared by means of chemical synthesis. These hydrotalcites are generally represented by the general formula:

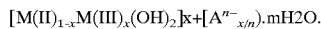

wherein

M(II) is a divalent metal cation

M(III) is a trivalent metal cation

A is a anion (mono, di, tri or tetravalent)

x is between 0.1 and 0.5 and m is lower than 1.

For example,
M(II)=Mg$^{2+}$, Ni$^{2+}$, Fe$^{2+}$, Co$^{2+}$, Cu$^{2+}$, Li$^{2+}$, Zn$^{2+}$, Mn$^{2+}$;
M(III)=Al$^{3+}$, Fe$^{3+}$, Cr$^{3+}$, Mn$^{3+}$, Ni$^{3+}$; A=F$^-$, Cl$^-$, Br$^-$, I$^-$, (ClO$_4$)$^-$, (NO$_3$)$^-$, (IO$_3$)$^-$, OH$^-$, (CO$_3$)$^{2-}$, (SO$_4$)$^{2-}$, (S$_2$O$_3$)$^{2-}$, (WO$_4$)$^{2-}$, (CrO$_4$)$^{2-}$, [Fe(CN)$_6$]$^{3-}$, [Fe(CN)$_6$]$^{4-}$, [SiO(OH)$_3$]$^-$, (PMo$_{12}$O$_{40}$)$^{3-}$, (PW$_{12}$O$_{40}$)$^{3-}$, derivatives of the arylsulfonate type, [Ru(4,7-diphenyl-1,10-phenanthrolinedisulfonate)$_3$]$^{4-}$, etc.

The method according to the invention can be implemented very simply, by mixing with the effluent reagents which are themselves simple and generally soluble in the aqueous medium of the effluent.

The present invention is illustrated by the following examples.

EXAMPLES

1—Preparation of hydrotalcite a) A solution A was prepared by dissolving 306 g of Mg(NO$_3$)$_2$, 6H$_2$O and 112.5 g of Al(NO$_3$)$_3$, 9H$_2$O in 345 ml of osmosed water. A solution B was prepared by adding 76.7 g of Na$_2$CO$_3$ and 216.3 g of soda at 50% to 490 ml of osmosed water.

b) Solutions A and B were added simultaneously to a 3 liter beaker containing 300 ml of osmosed water, with rates of addition of 103 ml/min for a period of about 6 mins. Solution B was used to keep the pH at a value of around 10.

c) After filtration and washing by 3×400 ml of osmosed water, the solid residue was dried for 20 hours at 70° C. (weight of dry residue=114 g). The residue was then ground until a particle size below 0.4 μm is obtained.

EXAMPLE 1 (Comparison)

An effluent coming from the washing tank of a Kodak RPX-OMAT process for medical X-ray films was treated as follows:

This effluent contained 2.5 ppm of silver and had a pH of 8.29.

A sample of 500 ml of this effluent was treated by adding to it 400 mg/l of an aluminium and magnesium hydrotalcite powder prepared as indicated above. It is stirred for 30 minutes and then filtered and the silver in the filtrate was measured by atomic emission spectrometry (Inductive Counting Plasma—ICP). The result of the measurement is given in Table 1 below.

EXAMPLE 2 (Comparison)

The same procedure was followed as in Example 1, except that 240 mg/l of the hydrotalcite from Example 1, previously calcinated for 2 hours at 400° C., was added. The result of the measurement of the silver in the filtrate is given in Table 1.

EXAMPLE 3 (Invention)

500 ml of the same effluent as in Example 1 was treated as follows. To the effluent was added 1.1 ml of a solution AlCl$_3$(0.5 M)+MgCl$_2$(2M). The pH was adjusted to 10 with a solution of 279 g of NaOH at 50% and 99 g of Na$_2$CO$_3$ in 900 ml of water. The mixture was stirred for 30 minutes, then filtered and the silver was measured in the filtrate as in Example 1. The result of the measurement is given in Table 1.

TABLE I

| Example No | Adsorbent | Silver (ppm) | Fall in Ag concentration (%) |
|---|---|---|---|
| 1 (Comparison) | hydrotalcite | 1.6 | 36 |
| 2 (Comparison) | calcined hydrotalcite | 1 | 60 |
| 3 (Invention) | hydrotalcite formed in situ | 0.04 | 98 |

EXAMPLE 4 (Comparison)

A mixture of developing and bleaching baths and washing water, coming from a photographic processing laboratory, containing 1.1 ppm of silver and 9.8 ppm of iron and has a pH of 7.22, was treated as follows:

To 50 ml of this effluent was added 600 mg/l of an aluminium and magnesium hydrotalcite powder prepared according to the method of example 1. The pH was adjusted with the Na$_2$CO$_3$ mixture of Example 3 and with a small amount of Ca(OH)$_2$. This powder was left in contact with the effluent while being stirred for 15 minutes, then the mixture was filtered and the silver and iron in the filtrate were measured. The result of the measurement by ICP is given in Table II below.

EXAMPLE 5 (Invention)

50 ml of the effluent of Example 4 was treated in the follows. To the effluent 0.16 ml of a solution AlCl$_3$(0.5 M)+MgCl$_2$(2M) was added. The pH was adjusted to 10 with the solution NaOH+Na$_2$CO$_3$ of Example 3, and the mixture was left to settle. The result of the measurement by ICP is given in Table II.

EXAMPLE 6 (Invention)

The same procedure as in Example 5 was repeated, except that 0.27 ml of the solution AlCl$_3$+MgCl$_2$ was used to form the hydrotalcite. The result of the measurement of the silver and iron by ICP in the filtrate is given in Table II.

TABLE II

| Example No | Adsorbent | Quantity of adsorbent mg/l | Silver (ppm) | Iron (ppm) |
|---|---|---|---|---|
| 4 (Comparative) | hydrotalcite in powder form | 600 | 0.98 | 6.1 |
| 5 (Invention) | hydrotalcite in situ | 600 | 0.13 | 0.94 |
| 6 (Invention) | hydrotalcite in situ | 1000 | 0.03 | 1.02 |

The effluent treated according to the invention can be discharged to the drains following neutralisation.

EXAMPLE 7 (Invention)

The same procedure as in Example 5 was repeated, except that the pH was adjusted with the solution $Na_2CO_3/NaOH$, plus 364 mg/l of $Ca(OH)_2$.

The result of the measurement is given in Table III.

TABLE III

| Example No | Adsorbent | Quantity of adsorbent mg/l | Alkali | Silver (ppm) | Iron (ppm) |
|---|---|---|---|---|---|
| 5 | hydrotalcite in situ | 600 | $NaOH/Na_2CO_3$ | 0.13 | 0.94 |
| 7 | hydrotalcite in situ | 600 | $NaOH/Na_2CO_3$ $Ca(OH)_2$ | 0.04 | 0.52 |

I claim:

1. A method for eliminating heavy metals from a photographic effluent comprising the steps of (i) forming a hydrotalcite in situ in this effluent by adding to the effluent (1) a mixture of salts precursors of the hydrotalcite and (2) an amount of an alkali comprising calcium hydroxyde and a mixture of an alkali metal hydroxide and an alkali metal carbonate, which permits the hydrotalcite to be precipitated in the effluent;

(ii) leaving the effluent and hydrotalcite on contact with each other for sufficient period to adsorb the heavy metals on the hydrotalcite, and (iii) separating the hydrotalcite with the heavy metals adsorbed thereon from the effluent.

2. The method of claim 1, wherein the photographic effluent contains iron and silver ions.

3. The method of claim 1, wherein the salts precursor of the hydrotalcite comprise a mixture of Mg and Al salts soluble in water.

4. The method of claim 3, wherein the Mg and Al salts are chlorides, bromides, sulphates or acetates.

5. The method of claim 1, wherein at least one of steps (i), (ii) or (iii) takes place in the presence of a silicate.

* * * * *